(12) United States Patent
Marmor

(10) Patent No.: US 8,195,772 B2
(45) Date of Patent: Jun. 5, 2012

(54) CONFIGURATION SETTING

(75) Inventor: Eliyahu Marmor, Kfar-Saba (IL)

(73) Assignee: Google Inc., Mountain View, CA (US)

( * ) Notice: Subject to any disclaimer, the term of this patent is extended or adjusted under 35 U.S.C. 154(b) by 994 days.

(21) Appl. No.: 10/574,759

(22) PCT Filed: Oct. 4, 2004

(86) PCT No.: PCT/IB2004/003228
§ 371 (c)(1),
(2), (4) Date: Apr. 3, 2006

(87) PCT Pub. No.: WO2005/033827
PCT Pub. Date: Apr. 14, 2005

(65) Prior Publication Data
US 2007/0055739 A1    Mar. 8, 2007

(30) Foreign Application Priority Data

Oct. 2, 2003  (IL) .......................................... 158282

(51) Int. Cl.
*G06F 15/177*    (2006.01)
(52) U.S. Cl. ........ 709/220; 709/218; 709/219; 709/226; 709/229; 709/246
(58) Field of Classification Search .................... 709/220
See application file for complete search history.

(56) References Cited

U.S. PATENT DOCUMENTS

| | | | |
|---|---|---|---|
| 5,819,092 A * | 10/1998 | Ferguson et al. | 717/113 |
| 6,161,126 A * | 12/2000 | Wies et al. | 709/203 |
| 6,338,086 B1 | 1/2002 | Curtis et al. | |
| 6,360,215 B1 | 3/2002 | Judd et al. | |
| 6,507,865 B1 | 1/2003 | Hanson et al. | |
| 6,615,166 B1 * | 9/2003 | Guheen et al. | 703/27 |
| 7,287,227 B2 * | 10/2007 | Ries et al. | 715/741 |
| 7,293,253 B1 | 11/2007 | Soukup | |
| 7,698,631 B1 * | 4/2010 | Toebes | 715/234 |
| 2003/0105746 A1 | 6/2003 | Stickler | |
| 2003/0191608 A1 | 10/2003 | Anderson et al. | |
| 2005/0229101 A1 * | 10/2005 | Matveyenko et al. | 715/530 |
| 2005/0273858 A1 | 12/2005 | Zadok et al. | |

(Continued)

FOREIGN PATENT DOCUMENTS

WO    WO 2005/033827    4/2005

(Continued)

OTHER PUBLICATIONS

Masahiro Hori, Mari Abe, and Kouichi Ono (Extensible Framework of Authoring Tools for Web Document Annotation), Mar. 2003.*

(Continued)

*Primary Examiner* — Yves Dalencourt

(74) *Attorney, Agent, or Firm* — Morris & Kamlay LLP

(57) ABSTRACT

A method of defining customization for electronic content retrieved over an electronic connection (100, FIG. 1), which retrieves electronic content from a remote server (110) to a local client (102); edits the content at the local client by a user using a WYSIWYG editor, wherein said editor is a standard software used for displaying of content and wherein said editing does not require installation of software requiring user authorization; and automatically generates at least one customization definition based on said editing, said customization definition suitable for automatic applying to said content.

52 Claims, 7 Drawing Sheets

U.S. PATENT DOCUMENTS

2008/0270591 A1 10/2008 Whittle et al.
2009/0083369 A1 3/2009 Marmor
2009/0109959 A1 4/2009 Elliott et al.
2009/0138790 A1* 5/2009 Larcheveque et al. ........ 715/224

FOREIGN PATENT DOCUMENTS

WO    WO 2006/109236    10/2006

OTHER PUBLICATIONS

International Preliminary Report on Patentability Dated Apr. 13, 2006 from the International Bureau of WIPO Re.: Application No. PCT/IB04/03228.
International Search Report Dated Jul. 18, 2005 from the International Searching Authority Re.: Application No. PCT/IB04/03228.
International Search Report Dated Jun. 18, 2007 from the International Searching Authority Re.: Application No. PCT/IB06/51090.
Official Action Dated Sep. 24, 2009 from the US Patent and Trademark Office Re.: U.S. Appl. No. 11/918,468.
Written Opinion Dated Jul. 18, 2005 from the International Searching Authority Re.: Application No. PCT/IB04/03228.
Written Opinion Dated Jun. 18, 2007 from the International Searching Authority Re.: Application No. PCT/IB06/51090.
International Preliminary Report on Patentability Dated Oct. 25, 2007 from the International Bureau of WIPO Re.: Application No. PCT/IB2006/051090.
Response Dated Mar. 24, 2010 to Official Action of Sep. 24, 2009 from the US Patent and Trademark Office Re.: U.S. Appl. No. 11/918,468.
Official Action Dated Jun. 11, 2010 from the US Patent and Trademark Office Re.: U.S. Appl. No. 11/918,468.
Response Dated Dec. 13, 2010 to Official Action of Jun. 11, 2010 from the US Patent and Trademark Office Re.: U.S. Appl. No. 11/918,468.
Official Action Dated Jan. 5, 2011 from the US Patent and Trademark Office Re.: U.S. Appl. No. 11/918,468.
Notice of Allowance Dated Mar. 22, 2011 from the US Patent and Trademark Office Re. : U.S. Appl. No. 11/918,468.

* cited by examiner

CONFIGURATION SETTING

RELATED APPLICATIONS

This application is a national phase of PCT Application PCT/IB2004/003228 filed on Oct. 4, 2004.

The application claims the priority from Israel Patent Application No. 158282, "Configuration Setting", the disclosure of which is incorporated herein by reference.

FIELD OF THE INVENTION

The present invention relates to configuration settings, for example for transformation of HTML documents.

BACKGROUND OF THE INVENTION

HTTP content, such as, HTML or XML pages (web pages) are presented to users by a client side web browser, such as Microsoft Internet Explorer and Mozilla. HTTP content includes elements, such as, text and pictures. Some browsers may regard HTTP content (such as HTML pages or XML pages) as a tree of elements.

Performing transformations on HTTP content results in modified HTTP content (modified web pages). The modified content may include changes only to the appearance of the HTTP content. Methods and software, to perform the transformations, have been reported in the art.

Various software tools such as Microsoft Front page may be used to modify a web page before it is placed in a web site for download.

An HTTP intermediary, such as an HTTP-proxy or a transformation proxy, can perform web page transformations. An HTTP-proxy is often used for interfacing web sites with a client web browser. An example of an HTTP-proxy is described in http://www.ietf.org/rfc/rfc2616.txt Several web browsers, for instance, Microsoft Internet Explorer, support creation of web pages. Attributes which may be set include modifying colors, fonts, hyper-links, and pictures. There are advantages to allow a user to create web pages using the same browser used to present the web pages, rather than using special tools.

The MSHTML-Editing-Component of Microsoft Internet Explorer described in http://msdn.microsoft.com/library/default.asp?url=/workshop/browser/editing/mshtmleditor.asp can be used to define an element or a plurality of elements as editable.

SUMMARY OF THE INVENTION

An aspect of some embodiments of the invention relates to defining changes to be applied to electronic content, in which the content is modified using a WYSIWYG editor and then the modifications are applied to a subsequent requester of the content.

In an exemplary embodiment of the invention, the method of defining changes does not require installation of special software at a user computer. Optionally, client-side code, such as Java script, Flash or Java may be used. Optionally, however, the code is selected so that a user with standard security settings is not required to approve of the execution of the software. In an exemplary embodiment of the invention, neither a client nor a server needs to make changes.

Optionally, ActiveX is used even though user authorization is required. In an exemplary embodiment of the invention, only client side code which does not have a danger of damaging the user computer is used. For example, code that executes in a sandbox is used, which machine code possibly even if protected, is not allowed.

In an exemplary embodiment of the invention, the user computer uses a standard browser for defining changes.

In an exemplary embodiment of the invention, changes are stored at an intermediary.

Optionally, such an intermediary serves for authorization and/or other functions. In an exemplary embodiment of the invention, special editing software executes on the intermediary and its display is piped to the user computer.

In an exemplary embodiment of the invention, a user modifies electronic content to suit his desires and code, for example downloaded code or code at the intermediary, analyses the changes, for example by comparing them to an unedited version, to determine customization definitions. Optionally, a user can override these automatically derived definitions.

In an exemplary embodiment of the invention, customization definitions include spatial or logical areas of the content to which rules will be applied.

In an exemplary embodiment of the invention, different types of translation are applied to different parts of the document.

In an exemplary embodiment of the invention, a hierarchical object defining language, such as XPath is used to define what elements of a hierarchical electronic content is to be modified. Optionally, An XPath expression is defined automatically based on a selection by a user or based on the object that the user modified.

An aspect of some embodiments of the invention relates to supporting a non-web graphical application for editing at a client computer which the application executes at a remote location. In an exemplary embodiment of the invention, a viewer is provided at the client computer and the display of the application is forwarded to the client computer. Optionally, the viewer does not require installation and/or user acquiescence, if standard security settings are used. Optionally, the usage of the application is transparent to the user, except for the actual editing.

In an exemplary embodiment of the invention, the application is executed automatically when a user edits a document which is not originating at the remote location. Optionally, when a user edits a page obtained from a server, the application is executed to act on a copy of the page.

There is thus provided in accordance with an exemplary embodiment of the invention a method of defining customization for electronic content retrieved over an electronic connection, comprising:

(a) retrieving electronic content from a remote server to a local client;

(b) editing the content at the local client by a user using a WYSIWYG editor, wherein said editor is a standard software used for displaying of content and wherein said editing does not require installation of software requiring user authorization; and (c) automatically generating at least one customization definition based on said editing, said customization definition suitable for automatic applying to said content.

Optionally, said retrieving uses an intermediary apparatus.

In an exemplary embodiment of the invention, said intermediary is an HTTP intermediary and wherein said content is a tagged data file. Optionally, said tagged data file is in a self-describing language.

In an exemplary embodiment of the invention, said language is a hyper-text mark-up language.

In an exemplary embodiment of the invention, said editor comprises an internet browser.

In an exemplary embodiment of the invention, automatically generating comprises detecting changes in said content caused by said editing, after said editing is preformed. Optionally, detecting changes comprises detecting changes using a hierarchical comparison of the electronic content before and after the editing.

In an exemplary embodiment of the invention, said intermediary comprises a proxy.

In an exemplary embodiment of the invention, the method comprises allowing of said editing by said intermediary. Optionally, said allowing comprises marking at least some of said content as editable. Alternatively or additionally, said allowing comprises adding at least one control to said content to facilitate at least one of editing and customization definition. Alternatively or additionally, said allowing comprises adding at least one client side code module to said content to facilitate at least one of editing and customization definition.

In an exemplary embodiment of the invention, said customization definitions define a spatial area to be customized.

In an exemplary embodiment of the invention, the method comprises overriding at least one automatically generated customization definition by said user.

In an exemplary embodiment of the invention, said editing comprises editing without typing human understandable words.

In an exemplary embodiment of the invention, said editing comprises editing by selection among choices.

In an exemplary embodiment of the invention, the method comprises manually defining at least one parameter of a customization definition. Optionally, said defining comprises defining different types of translation for different parts of said content.

In an exemplary embodiment of the invention, said overriding comprises requiring an exact match of an element of said content to a definition, for a customization to be applied.

In an exemplary embodiment of the invention, said overriding comprises allowing a match other than a one-to-one match to a definition, for a customization to be applied.

In an exemplary embodiment of the invention, a customization definition is defined by a context in said content. Optionally, said context is an expression defining elements in said content to be part of the context. Optionally, said expression is an hierarchical expression. Optionally, said expression is an XPath or XPath-like type expression. Optionally, said expression is generated automatically. Optionally, said expression is generated in response to an editing activity.

In an exemplary embodiment of the invention, said expression is generated in response a marking by a user.

Optionally, a context is defined based on a spatial location, during a display of the content, of a label associated with an element to be customized. Optionally, an association of a label and an element is identified using a browser-internal script which finds spatial positions of the labels and spatial positions of nearby elements.

In an exemplary embodiment of the invention, said intermediary authorizes said user to perform said editing.

In an exemplary embodiment of the invention, said intermediary executes an editing program for editing an element of said content, a display of said program being provided to said client an input from said client passed to said program. Optionally, said intermediary limits access of said user to said intermediary via said editing program.

In an exemplary embodiment of the invention, the method comprises saving at least one customization definition for later use. Optionally, the method comprises applying said at least one definition to content requested by a second user. Optionally, the method comprises deciding at least one property of said applying based on information associated with a request by said second user. Optionally, said deciding comprises deciding if to apply a customization definition.

In an exemplary embodiment of the invention, said deciding comprises examining a cookie at said second user. Optionally, said content to which said at least one customization definition is applied is dynamic content including at least one element whose content changes over time.

In an exemplary embodiment of the invention, said applying comprises determining a context. Optionally, determining a context comprises evaluating an XPath or XPath-like expression.

In an exemplary embodiment of the invention, determining a context comprises determining spatial positions of labels associated with an element to be modified based on the customization definitions.

There is also provided in accordance with an exemplary embodiment of the invention, a method of editing content, comprising:

(a) requesting content from a first location;

(b) executing an editing application at a second location; and (c) carrying out the editing at a third location, using a viewer for viewing said editing application, without installing software at the third location other than said viewer. Optionally, said second location comprises an HTTP-intermediary. Optionally, said viewer comprises a browser.

In an exemplary embodiment of the invention, said editing application is automatically executed when a user at said third location attempts to edit an element suitable for editing by said application.

In an exemplary embodiment of the invention, said application is executed in a manner which at least partially protects said HTTP-intermediary from access by said user.

There is also provided in accordance with an exemplary embodiment of the invention, an HTTP intermediary, comprising:

(a) an HTTP connection to a server;

(b) an HTTP connection to a user;

(c) a page modifying module operative to add at least one of code and controls to a page requested by said user from said server, said code or control adapted to facilitate at least one of editing and customization definition. Optionally, the intermediate comprises a page transformer adapted to modify retrieved pages on the fly based on saved customization definitions.

There is also provide din accordance with an exemplary embodiment of the invention, a browser having downloaded thereto at least one client side code, said client side code adapted to at least one of allow editing of content and determine changes due to editing of content

BRIEF DESCRIPTION OF THE FIGURES

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION OF EXEMPLARY EMBODIMENTS

Overview

The invention, in some embodiments thereof, generally relates to automatically transforming an electronically accessed document, for instance HTML pages, before the documents are presented to a user by a client browser. Optionally, an HTTP intermediary, such as, a transformation proxy performs the transformations. Optionally, the transformations are performed according to customization definitions. The term proxy is sometimes used instead of the term "intermediary".

The term document refers to any document that can be presented by a web browser (or other display software, as described below), and may include, for example, web pages, HTML pages, and XML pages. In some cases the term "web page" is used interchangeably with the term "document".

Figure 1:
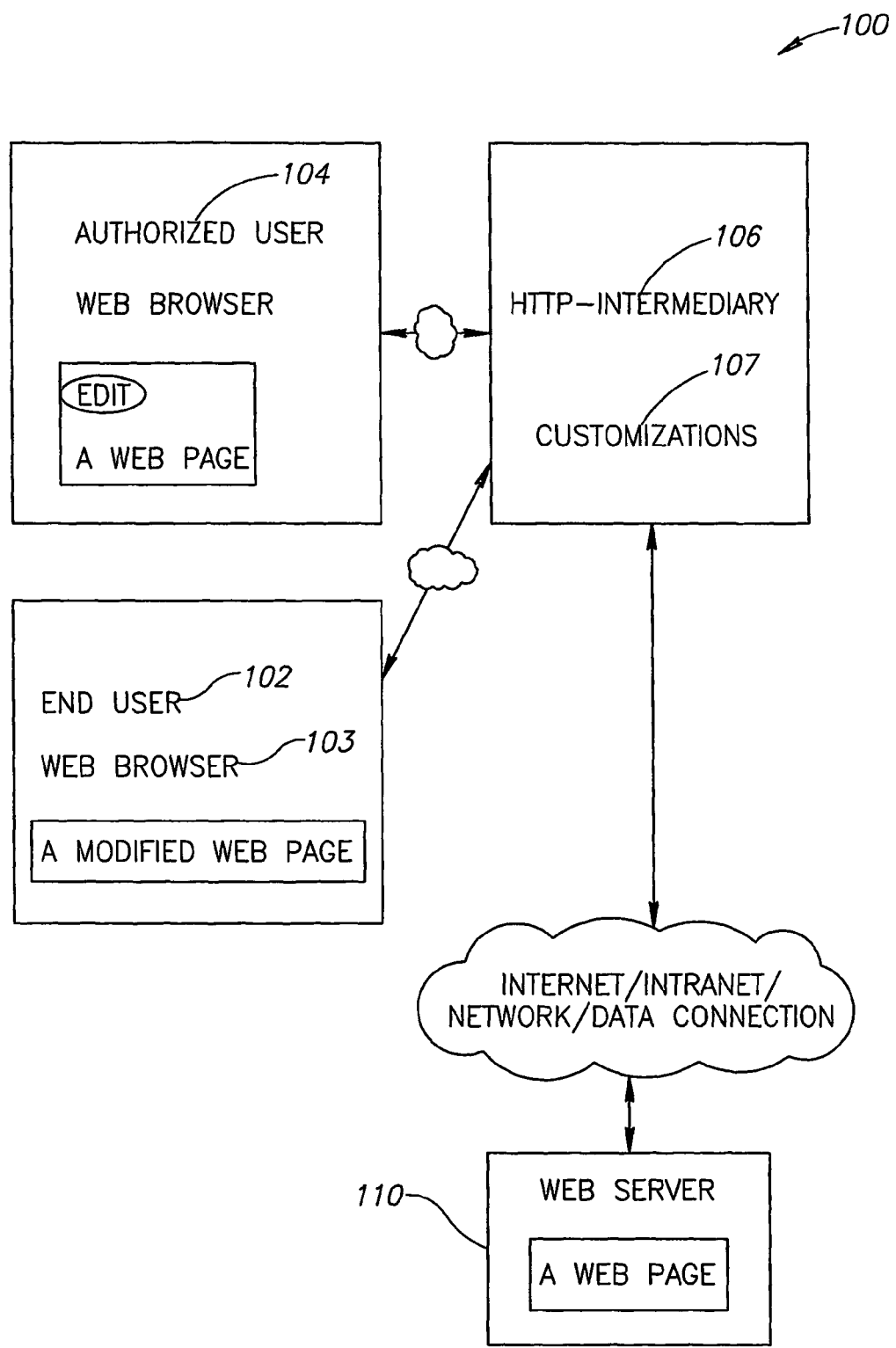
FIG. 1 shows a configuration in which some embodiments of the invention may be carried out, in accordance with an exemplary embodiment of the invention.

FIG. 1 shows a configuration 100 for carrying out some embodiments of the invention. An end user 102 using a web browser 103 requests a web page (e.g., using a URL) from a web server (110). Optionally, this request is handled by an HTTP intermediary (106), which can be for example a proxy server. As well known in the art, there can be various additional intermediate devices, which are not shown, for example, routers, cache and firewalls. The web server with the desired web page sends the page back to the HTTP intermediary (106). At HTTP intermediary 106 the page can be automatically modified according to stored customization definitions (107). Optionally, HTTP intermediary 106 serves only as a transformation proxy. Alternatively, it may have additional functions (such as caching, compression and encryption). Optionally, the methods described herein is used to define parameters for such additional functions, for example setting an allowed compression quality degradation or using a dialog box for entering encryption parameters.

The following description focuses on preparing a plurality of customization definitions by an authorized user. Various exemplary authorization methods are described below. In some embodiments, no authorization process is provided and any user may be considered authorized. When an authorized user connects to HTTP intermediary 106, the authorized user receives modified web pages in which elements were optionally made automatically editable by the HTTP intermediary and also new elements, such as buttons, are added. This will allow the authorized user, but not a non-authorized user, to create customization definitions, as will be described below. Various examples of customization definitions will be described below.

In an exemplary embodiment of the invention, an authorized user requests a web page by using a web browser, and the HTTP intermediary inserts active code, for instance JavaScript, to allow elements in the page to become editable. In addition the HTTP intermediary may add GUI, for instance an "edit" button, to allow the user to edit elements. The modified web page, which includes the added "edit" button, as well as elements from the original web page, is presented to the authorized user by a client browser.

Optionally, the edit button is used to selectively allow editing. Optionally, several edit buttons are provided. The authorized user may select the "edit" button, and this will enable elements to become editable. After the user finishes editing the page he may save the edited page to the intermediary or locally by selecting a suitable button. Editing elements is done in a "what you see is what you get" (WYSIWYG) manner. The result of the editing done by the authorized user may include customization definitions that may be saved at the HTTP intermediary. In some embodiments, what is saved is the modified page.

Exemplary Process

Figure 2:
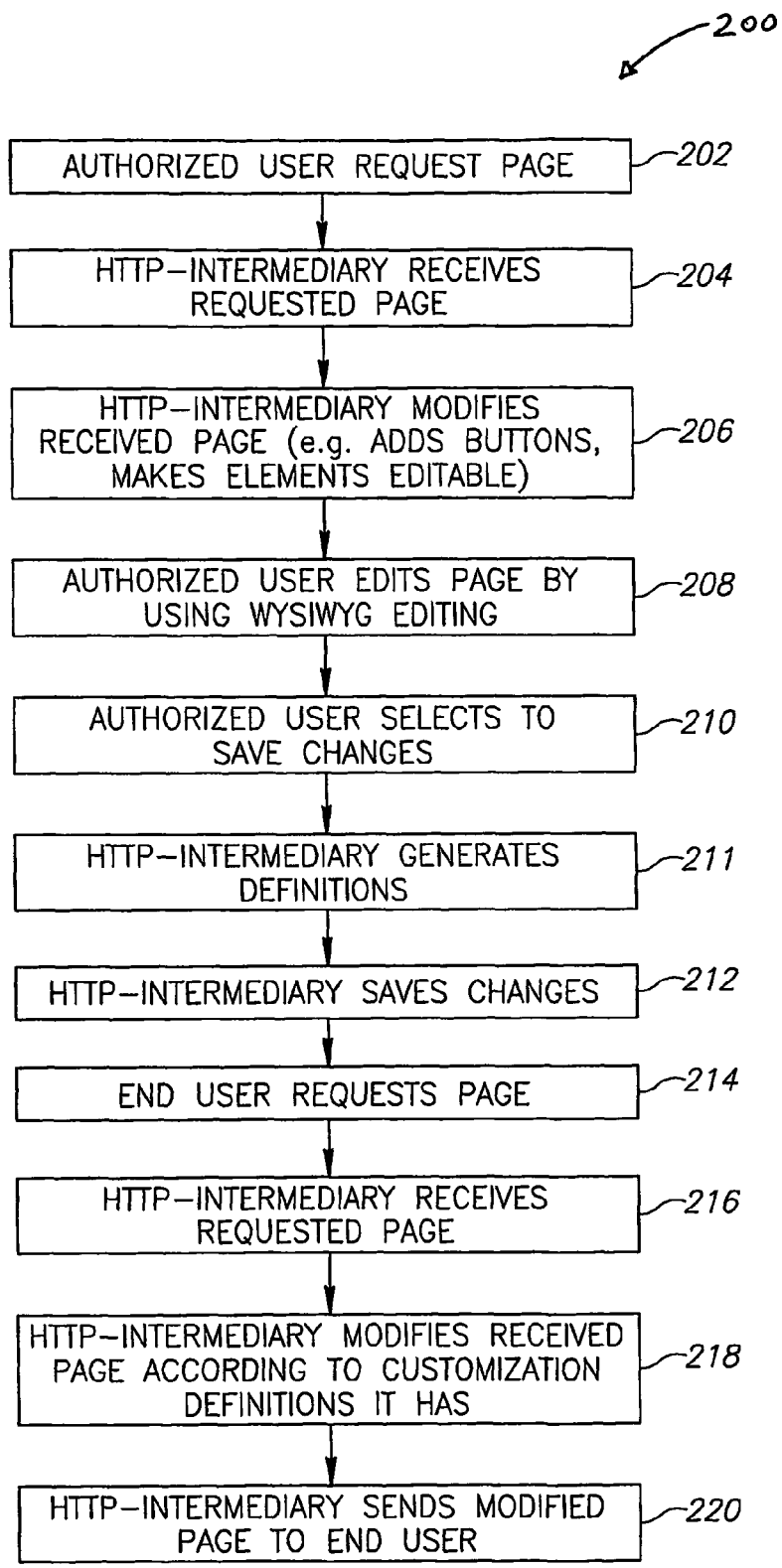
FIG. 2 is a flow chart of an embodiment of the present invention.

FIG. 2 is a flow chart 200 of an exemplary embodiment of the present invention. Acts 202-212 relate to customization definition and acts 214-220 relate to modification of a page during delivery.

At 202, an authorized user requests a page.

At 204, intermediary 106 retrieves the page. Optionally the received page or elements of it are saved at the computer the editing software runs. In an exemplary embodiment of the invention, intermediary 106 forwards the request to server 110, optionally as is and optionally modified, receives the page from server 110, optionally applies existing customizations and adds an editing GUI as described herein. Optionally, the page is retrieved from a local cache.

At 206, intermediary 106 modifies the retrieved page, for example by adding buttons, scripts and/or making elements editable.

At 208, the authorized user modifies the page and optionally views the results in a WYSIWYG manner. In an exemplary embodiment of the invention, the modification is by simple editing of the page in which the authorized user can make one or more changes in the page until the page is "correct".

At 210, the authorized user saves the page.

At 211, intermediary 106 optionally generalizes the modifications made by the authorized user into customization definitions which are optionally used for other pages.

At 212, intermediary 106 saves the modified page and/or the definitions. Optionally, the definitions are associated with certain users, for example, certain IP addresses, geographical locations or user profiles.

Later, at 214, a regular user requests the page.

At 216, the requested page is retrieved.

At 218, intermediary 106 optionally modifies the page according to the customization definitions.

At 220, the modified page is sent to the user.

Each of the acts in FIG. 2 is optional. In some embodiment of the present invention certain acts will be carried out, and in other embodiment of the present invention other acts from acts 202-220 will be carried out.

Exemplary Usage of Customization

In an exemplary embodiment of the invention, configuration 100 is used when there exist a web site with web content provided in one language and it is desired that a group of users not fluent in that language be able to access the content. The use of intermediary 106 allows this to be accomplished even without any changes at the web server 110. Optionally, the generator of the original content indicates which pages or parts of pages should be modified and/or are allowed to be modified. During translation, it may be necessary to make other changes in a page, for example, to match a cultural logic of a projected user or to accommodate different word sizes.

Customization Indication

In an exemplary embodiment of the invention, intermediary 106 analyses retrieved web pages to determine which elements are amenable for customization, for example text element. Alternatively, substantially any element may be allowed for customization. Alternatively or additionally, parts to be customized may be pre-indicated.

Optionally, the generator of the page includes buttons or other indication for customization, such as suitable indicative naming of elements (e.g., such as a name extension). Optionally, the page includes a script which selectively displays or hides the buttons depending on the authorization of the user.

Customization

In an exemplary embodiment of the invention, intermediary 106 generalizes the changes made by the authorized user into rules. Examples of such generalized definitions include one or more of:

(a) translation (e.g., replacement of text);
(b) changing of font.
(c) changing of text direction;
(d) changing of attributes such as size, color, transparency;
(e) replacement of an image;
(f) overlays that hide other elements or are transparent;
(g) scripts and client side code; and
(h) additional elements, for example, new buttons to provide help in a local language;

In addition, for example as described below, various modifiers may apply. For example, translation can be set to be machine translation or static translation. Matching of a rule may be set to be an exact matching or an approximate matching (e.g., using wild card characters).

Alternatively or additionally, intermediary 106 may store the entire modified pages, rather than customization definitions.

Transparency

A particular feature of some embodiments of the invention is that no special software and/or actions are required by the authorized user. Alternatively or additionally, no changes are required in web server 110.

In some cases the "proxy definition" field in the browser may need to be updated. For instance, if the HTTP intermediary is a "forward proxy" the "proxy definition" in the browser may have to be defined. In other cases, for example if HTTP intermediary 106 is a "reverse proxy", a "transparent proxy" or an HTTP server, there is no need for updating the "proxy definition" in the browser.

Optionally, there is no need to install any software at the client side, except a suitable browser such as Microsoft Internet Explorer or Mozilla. Optionally, there is no need to for any plug in or client applications. Optionally, there is no need for authorization for automatic installation of an ActiveX or an active content that requires user authorization in order to be installed. Optionally, it is assumed that default security settings are provided. Otherwise, JavaScript as described below in the examples may require a non-standard user authorization in order to be allowed. However, in an exemplary embodiment of the invention, no changes are needed or desired on the machine used by the authorized user, so that tools which do not require such changes can be used.

In an exemplary embodiment of the invention, the editing provided by the Web browser is further transparent in the sense that it is a WYSIWYG type editing in which a user is not required to guess what the results of his editing will look like.

Document Modification

As noted in FIG. 2 (206) the proxy sends authorized users documents that were modified by the proxy. This modification allows the document to become editable. In some embodiments of the invention the document becomes editable, i.e. in edit mode, after the authorized user selects a button that the proxy added to the page, or some other trigger, for example as described below with respect to authorization. In some embodiments, the page is not modified by the proxy as the page is generated to be suitable for customization. In addition the proxy adds a button or some other trigger to allow the user saving the editing done. The button used for saving the document is optionally the same button that allowed the document to become editable. Optionally, the text and/or the image of the button change.

Optionally, the proxy adds to the document two client side active codes: a first active code that is executed before editing starts, and a second active code that is executed upon termination of editing. These two active codes are optionally callbacks of the above button(s), and in particular may be JavaScript code or another type of client side code, such as JAVA or Active X. Different types of client side code have different levels of security requirements and different levels or efficiency and these levels may serve to decide about selecting between them. In an exemplary embodiment of the invention, where the second code determines by detecting changes what editing has been performed by the authorized user, the first code optionally may copy all data needed about the page and its content before it makes it editable.

Optionally, setting elements to being editable is automatic on loading. Alternatively, it may require user command (e.g., selection of a button).

Transforming the page to editable mode is optionally selective, for example by skipping certain elements in the page. This selection is usefull for preventing the proxy-added elements from being edited. To facilitate this selection, those elements are optionally marked, for example by unique names, or attributes to distinguish them. Alternatively or additionally, the added elements are contained in a special element.

Optionally, the client-side code recognizes if such added elements were modified and if so, it undoes the changes.

The second active code, activated upon ending the editing, optionally sends the final result directly to intermediary 106 (e.g., for storage therein or for performing a comparison thereon). Alternatively, the changes themselves are sent. Optionally those changes are processed before they are sent. Optionally processing the changes include adding rules and/ or definitions, for instance by using a dialog box, or automatic generation of rules (which may be performed or supplemented on at intermediary 106).

In an exemplary embodiment of the invention, changes in the document are found using recursion or a hierarchical comparison. The tree of elements in a page is traversed and a current value is compared to a value saved by the first active code. Upon termination of finding the changes the second active code can send the information, such as an identification of changes or definitions directly to the proxy, or alternatively open a dialog-box, which will allow adding or modifying customization definitions or changes before sending to the proxy.

Figure 3A:
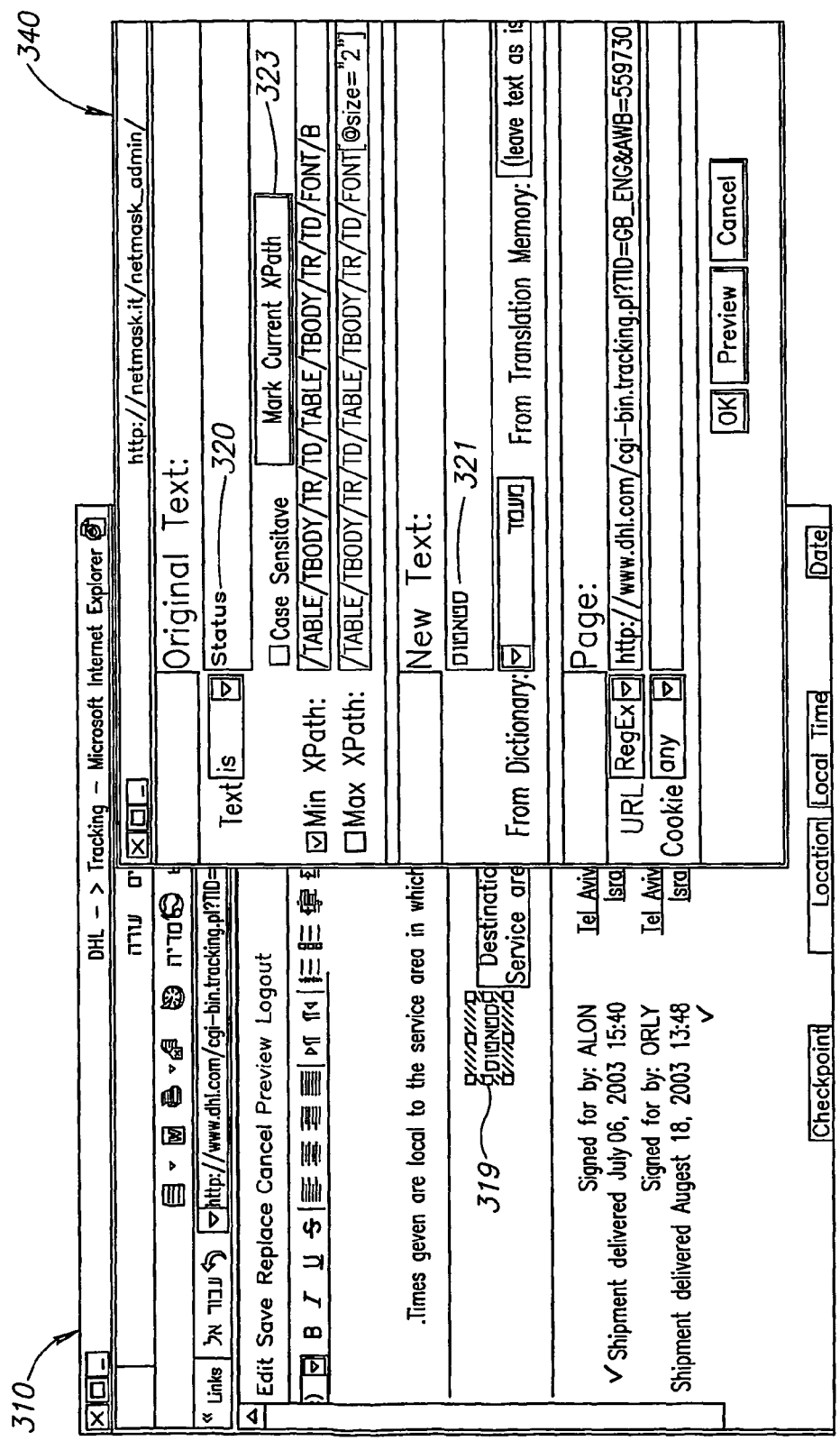
FIGS. 3A and 3B are showing of a display used for configuration settings, in accordance with an exemplary embodiment of the invention.
Figure 3B:
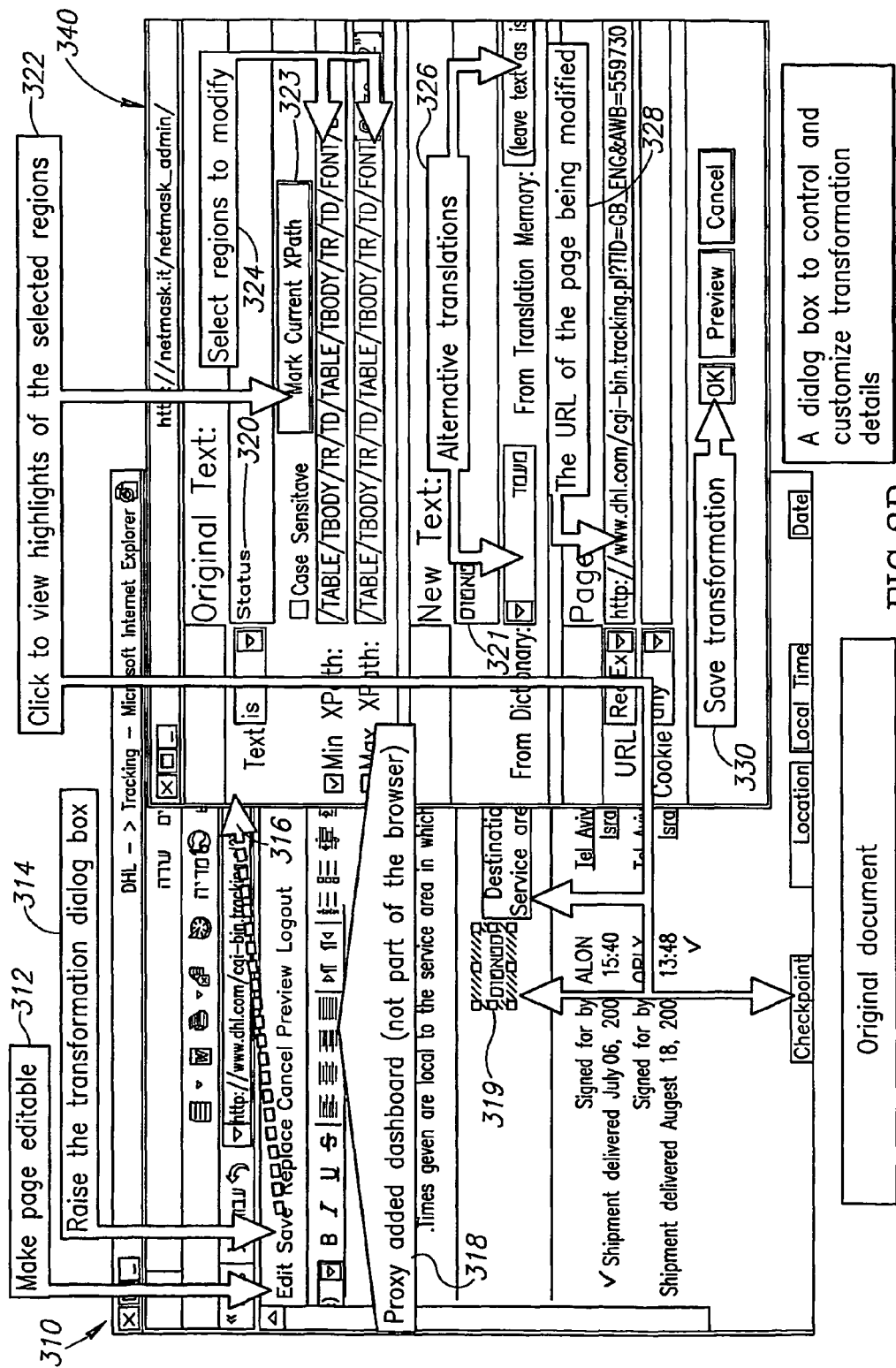

FIGS. 3A and 3B are a showing of a display used for configuration settings, in accordance with an exemplary embodiment of the invention; and in particular illustrates such a dialog-box (340). FIG. 3A shows a web page (310) sent to an authorized user, which page was modified by the proxy. The modification includes adding buttons, such as, "edit", and "save". After the authorized user selects the "edit" button, the web page becomes editable. FIG. 3A shows the page after the user already started editing the page. Dialog-box (340) is open and the authorized user is in the middle of translating the word "Status". An original text (320) will be translated using a new text (321) (in Hebrew). A field in the original window which is edited (containing the word "Status" in Hebrew) (319), is surrounded by squares and a special frame. FIG. 3B shows everything shown in FIG. 3A with arrows and explanations. For example, selecting the "edit" button (312) makes the page editable; Selecting "OK" button (320) saves the transformation; a reference 326 points to alternative translations.

In an exemplary embodiment of the invention, the page has an earlier customization definition applied to it. Optionally, this customization is applied prior to intermediary 106 providing the page. Optionally, when the changes are detected by the second active code, the user is notified of the previous existing changes. Optionally, a button or other means is provided for the user to undo the changes. Optionally, the prior customization rules are shown to the user for acceptance or overriding. Optionally, a user can request to apply definitions of another page to the current page. In one example, a user defines customizations for a web site and then these customizations are associated with other pages (e.g., in a hierarchal or object-oriented inherence manner).

Optionally, other methods of reaching the dialog box or information are provided in one example, a user can view a list of definitions and then open a dialog box from such a list. In another example, when a mouse is brought over a change, a tool tip with the old change and optionally a button (or the tool tip may be clicked) to open the dialog, is provided.

Optionally, customizations are defined for a single user or subset of users. Optionally, the customizations are defined by the target user himself, for example, rearrangement of the web page.

Exemplary Application

A usefull application of some embodiments of the invention is replacing words in a page or document, received by the authorized user, by other words, for example for performing static translation. An authorized user may also want to use a translation proxy like WizTom (www.wiztom.com), and some embodiments of the invention will allow him to perform translations using a WYSIWYG user interface in the client browser without loading any other software.

In an exemplary embodiment of the invention, after the changes are completed by the user, the user is presented with a dialog box that includes input fields containing the (original) first text and the (replacement) second text. Optionally, the replacement text is generated on the fly by accessing a machine translator. Optionally, there are special codes or elements that if inserted by the user editing the page, indicate to the code that data should be generated. For example, a special code may be used to indicate that a nearby word should be edited. The authorized user can change the texts in the dialog box, for example, allowing a user to reformat, make changes and/or review machine translation results. Optionally, the transformation will be executed when an exact match to the first text is found.

In another embodiment of the invention the match does not have to be exact. The match for instance can be based on a regular expression or on a case-insensitive match, or any other approximate match chosen by the authorized user using the dialog box, for example using approximate matching methods as known in the art.

Figure 4A:
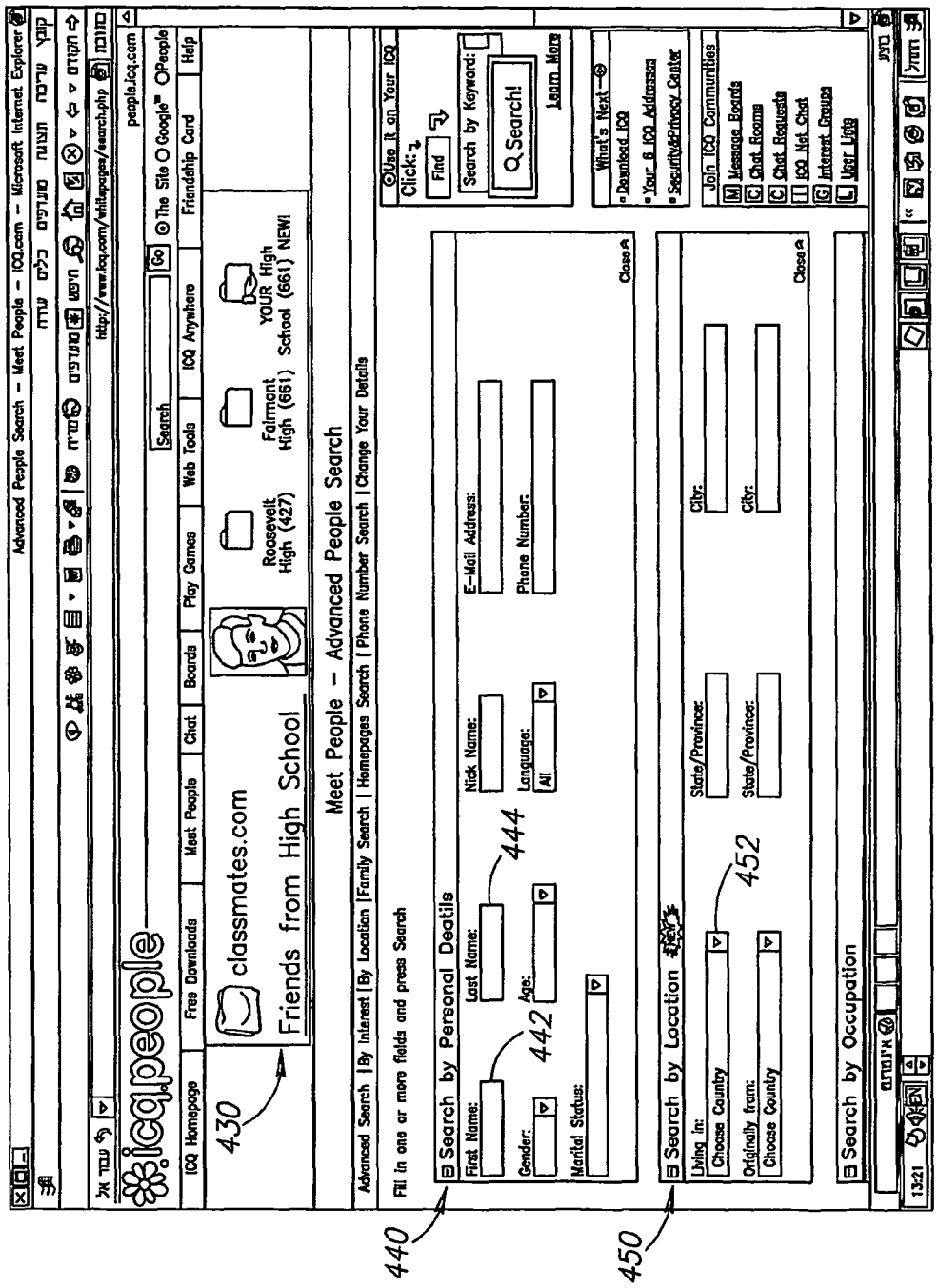
FIGS. 4A-4C show (4A) an original page displayed by a normal user, (4B) during editing by an authorized user, and (4C) after applying the defined transformations to the page when accessed by the normal user above, according to an exemplary embodiment of the invention.
Figure 4B:
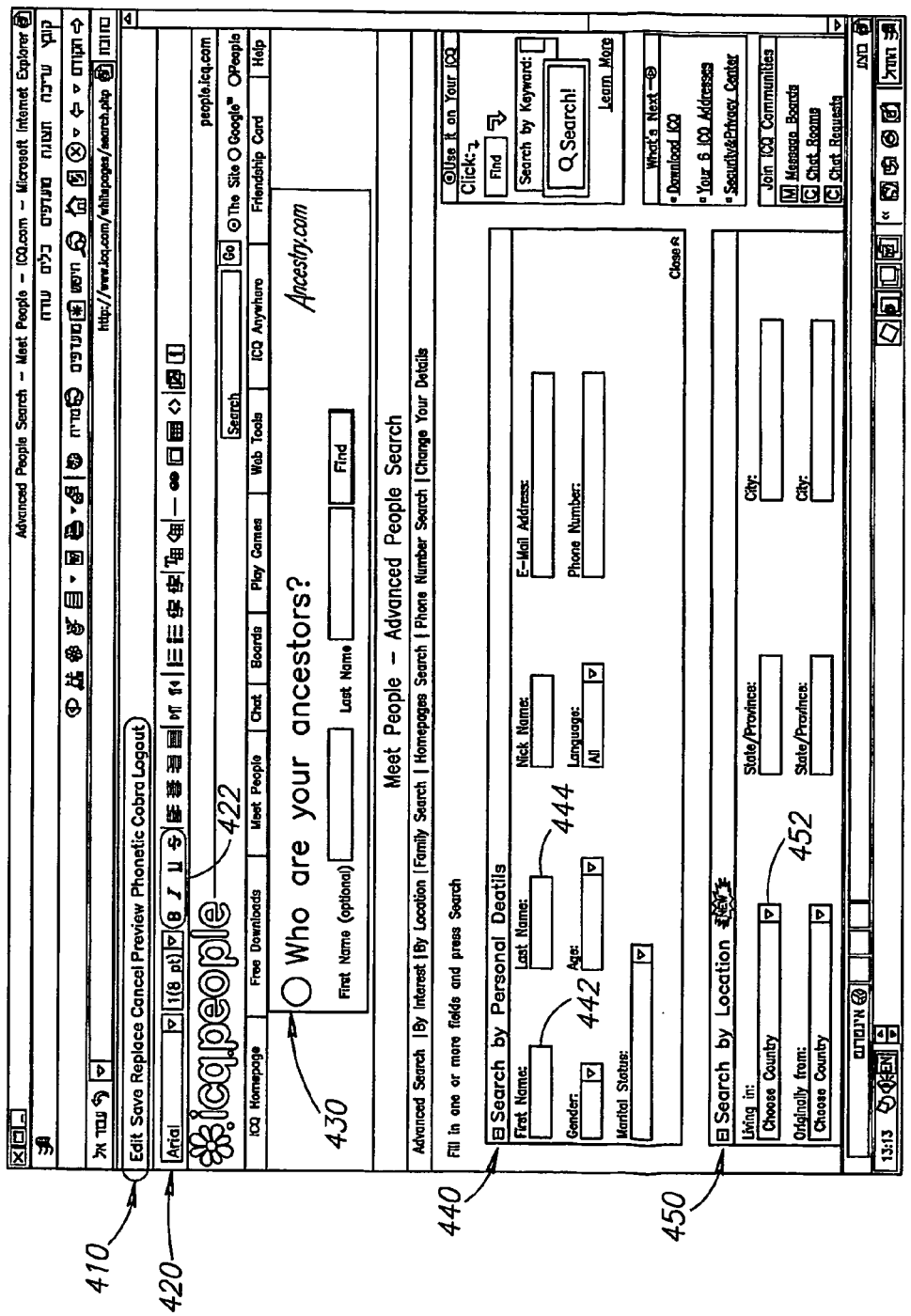
Figure 4C:
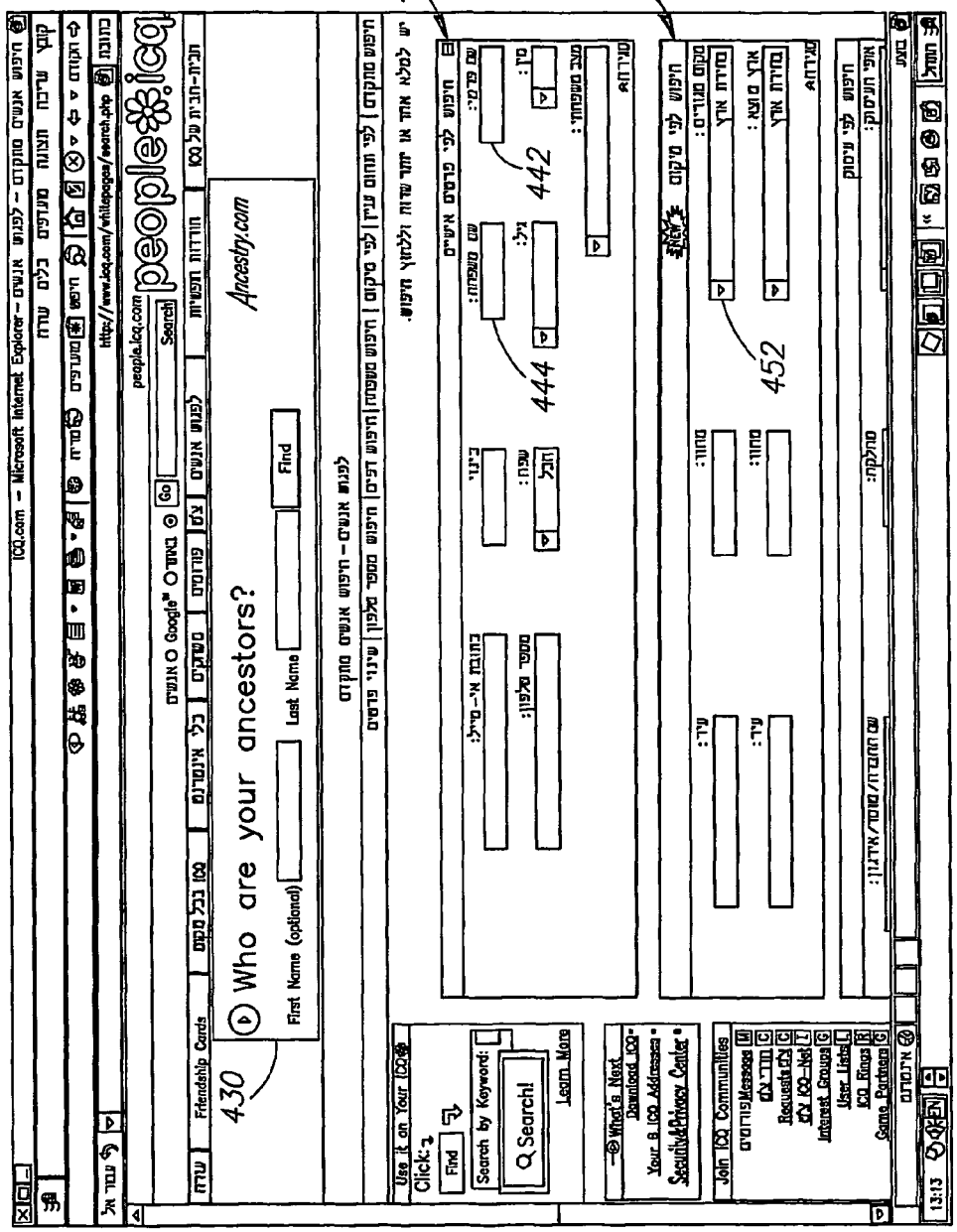

FIGS. 4A-4C show a sample web page before, during and after transformation, according to an exemplary embodiment of the invention. In FIG. 4A the original unmodified page is shown. It includes, for example, an advertisement (430), a "Search by Personal Details" (440), and a "Search by Location" (450). FIG. 4B shows the page in FIG. 4A displayed to an authorized user. In FIG. 4B the original page was modified by the intermediary. For example, buttons 410 were added, and also the elements of 420. The buttons added are used by the authorized user to define customizations. FIG. 4C shows the page as presented to an end user after customizations were applied to the page of FIG. 3A. In FIG. 4C words were translated from English to Hebrew. For instance in FIG. 4A a plurality of elements 442, 444, and 452 are in English, and in FIG. 4B they are in Hebrew. Also the orientation of elements, for example 440, 450, 442 were changed from left to write in FIG. 4A to right to left in FIG. 4C. The orientation of advertisement 430 was not changed by the customizations; however the advertisement was replaced by another advertisement.

Input

In the input field of the replacement text, the authorized user is provided with a plurality of existing alternatives, instead of typing text or editing the existing text. The various alternatives may be presented, for instance, as a "selection-box", or as a "pull-down", or as a "pop-up", or by other ways allowing choosing from several alternatives. Optionally, these alternatives are provided by the user highlighting a word and selecting a control added by the proxy. Optionally, the alternative choices are provided from an output of an algorithm applied to the (original) first text. The algorithm may be using a dictionary or a "machine translator" that translates from one language to another language. Optionally, a translation memory which includes previous translations of the word as used by a same user or other users, for this or other sites, is used to select alternatives. Optionally, the translation is shown in context as used previously. Optionally, a translation memory is used to foster parallel translation of a web site by multiple users and/or to enforce standard and consistent translation. Optionally, saving replacement text suggested by users can be used to create the replacement text alternatives.

In an exemplary embodiment of the invention, these methods of input allow users to translate documents without typing. The document can be changed to an editable state, for example, by selecting a button, marking a word, delete a word (i.e. to replace it with a word of zero length characters), and press a button that opens the dialog-box. In the opened window, the original text will appear, and instead of the new text, an empty field will appear. With this method of selection, a user can choose the most suitable translation for the original word from several translations presented. Alternatively, a user can look at various translations that other users provided for the original text, and choose one of them. Optionally, translations are provided by users of the content. Thus, an authorized user can review suggested translations by users and then accept these translations and make them the formal translation of the term. Optionally, not all users of a page are considered authorized to make suggestions. Optionally, the authorized user only needs to end the work at the dialog-box (by pressing a suitable button, or in some other way), to accept all the suggestions made.

In some embodiments of the invention, if the code which generates the dialog-box is sent to the browser, as part of the original document, the code cannot include the various translations or the translation memory, because the code was generated before the user performed the changes in the document and the required translations are not known. Optionally, the dialog box sends the original text to a proxy or suitable server, and receives from the proxy as an answer the various alternatives for translation. Optionally, the transmission method is XmlHttp used by JavaScript executing on the client computer Additional Transformation Examples Some embodiments of the invention are useful for any change in the document, including but not limited to, design change (for instance emphasizing a word), RTL orientation change and DHTML/CSS effects, and many other transformations. The same inventor, Marmor, describes RTL orientation changes in U.S. Pat. No. 6,601,108. Some embodiments of the invention are used for defining areas in the documents as candidates for a transformation that will be performed on them when they are passing through the proxy. In another example, what is defined is one or more properties of any such transformation. For example, an area (e.g., section of the document) may be marked for phonetic translation (translating a name according to a sound and without keeping the original meaning), or Machine Translation into a different language of its own. Different parts may have different languages for source or target translation associated with them. Similarly, two or more of phonetic and static and/or machine translation may be assigned for some areas.

Supposing for example the translation of an invoice, having fixed titles and text labels (such as "Name:", "Price:", "VAT:"), and also dynamic values which include numbers and don't need translation, and names (such as "John", "David") that require phonetic translation. There are tools that perform each of those tasks separately. For instance, Google (http://www.google.com/machine_translation.html) and Babel-Fish (http://babel.altavista.com/) include proxies that are able to perform machine translation on content passing through that proxy. The problem is that if the invoice includes the word "Bill" (from "billing") and a name of a person "Bill", machine translation may translate both as "billing", and a phonetic translation may translate both as person names. Therefore, in accordance with an embodiment of the invention, it is useful to limit each translation to a specific spatial or logical context (e.g., based on position or based on nearby or including elements) in the page.

In an exemplary embodiment of the invention, the dialog box includes an input field that describes such a context. An exemplary suitable language to describe context in a web page, is XPath, which is included in the XSLT language. The language was invented for performing transformations on XML, but can be used also for HTML.

It should be noted that many users may find it difficult to create expressions in this language. In an exemplary embodiment of the invention, the downloaded code (or the proxy, e.g., upon request by the code), will generate an expression corresponding to the location of the selected/edited word. Optionally, a user is limited to accepting or not accepting the use of a context expression. Alternatively or additionally, a user can change the initial expression to be more general or less general, which can be simpler than creating this expression from scratch. Optionally, a button (or other control) is included which allows a user to ask the code to mark the parts of the document which are defined by the current XPath expression. Alternatively or additionally, a user can mark areas for the code to convert into an XPath expression. Marked areas can be highlighted in various ways, such as, blinking and/or coloring.

In an exemplary embodiment of the invention, a testing feature is provided ("Preview"), in which when a user make a general definition, such as an XPath expression, the user can apply the current definitions to a page and see the results, optionally with changes marked. Optionally, this is provided by adding a button which is used to test the existing definitions. Alternatively or additionally, such a button is used to apply the definitions to a different page, for example, by saving the definitions on the intermediary and then applying them when requesting a different page. Optionally, a control for browsing and/or saving such definitions is provided by intermediary 106. Optionally, a user can temporarily turn off (or on) one or more definitions, to determine their effect.

In another method of context definition, a context is defined by text that appears near the button, for example HTML commands as viewed as a text file (e.g., "value="OK" can serve as a context).

In another method of context definition, spatial position on a display is used to identify a matching of text labels in the HTML file and buttons or areas on the screen which can/should be modified.

Exception Definition

Optionally, additional input fields that may be included in the dialog-box (or in another interface method) are input fields that limit the execution of the transformation not to a specific context in a page, but also to particular pages. One example is the TITLE of the page (the text between the "<TITLE>" and the "</TITLE>" tags), or the internal header of the page (e.g. the text between the first "<H1>" and "</H1>" tags of the page). Another such input field will include the address of the page, or parts of that address (for instance the hostname or the port). The initial value is optionally taken from the address of the page the user modified. Optionally, the user can change the value of that field and/or to check/uncheck a checkbox near that field that indicates whether to limit the transformation to that page.

In an alternative embodiment, a user can define the value of this field as a regular expression and not necessarily an exact value. Optionally, this is a default condition, with wild-card characters being recognized automatically.

Additional Input

Input not directly related to the desired transformation may be provided as well. For example, such input may include the name of the authorized user, parameter values of the request causing the page generation (for instance HTTP-GET-parameters or HTTP-POST-parameters), time of change, a usage counter, values of HTTP cookies, Age (of the document in seconds), Server (e.g. Apache/2.0.51), Content-Encoding (for compression), Content-Language (the language of the document, such as en, fr and he), Content-Length, Content-Type (e.g. text/html, image/gif), Expires (for caching purposes), Last-Modified and any other data included in HTTP-headers of the request or in the body of the request.

In an exemplary embodiment of the invention, cookies or other information are used to define if to apply the transformations at a user. In an exemplary embodiment of the invention, if a user (regular user) sends a request and has a certain cookie or HTTP header information, a modified page is provided. The modification may depend on the parameters provided by the cookie header or other method.

Additional Transformations

Additional transformations can be carried out by a transformation-proxy as described herein (e.g., intermediary 106). In accordance with an exemplary embodiment of the invention a web user interface, in a WYSIWYG way, making use of the internal editing capabilities of browsers. One such transformation, of a type described in U.S. Pat. No. 6,601,108 by the same inventor, reverses the main direction of the document (or parts of it), and can be used for languages such as Hebrew and Arabic. In suitable browsers, because the internal editing capabilities of browsers include support for direction change, such transformation can be defined by entering into an editing mode, marking the part that needs change of direction, performing the change by the browser (for instance by using a "direction" button), and saving (or entering a dialog-box). The method described above regarding comparing the document before and after editing allows the code to find rapidly the change, and to create a suitable transformation rule (customization definition).

Area Definitions

In an exemplary embodiment of the invention, areas can be defined in a document, also without actually making changes (which can be discovered by comparison). In an exemplary embodiment of the invention, areas are defined using an ability of a client-side-active-code to identify which areas on the display screen are marked, and to open a dialog-box (or to submit directly a transformation rule for those areas) immediately upon ending the editing or upon pressing a suitable button. Thus, customizations definitions can be defined even if nothing was changed in the document and only areas in the display screen were marked). In an exemplary embodiment of the invention, areas are used to define customization definitions such as "translate text in these areas by phonetic translation" or "translate text in these areas by Machine-Translation", as described above. A hierarchy and/or order may be defined between overlapping areas, for example by providing the definitions with an ordinal number. As noted above, areas may be spatial and may be logical, for example, based on a semantic analysis of a document.

Non-Standard Editing

In some cases, there may be a desire to provide the user with special editing software for one of the elements included in a page. It may be undesirable to provide such software at the client side for one or more of the following reasons: a) dependency on software the user has to install and might not be able to; b) it is not known whether that software can run on the computer platform the user uses; c) the user must save the element as a file in his computer; d) the user must manually activate the software; and e) the user has to submit the result back to the HTTP-intermediary.

In an exemplary embodiment of the invention, a combination of a remote-display, and a viewer that is written as client side active code, is provided. The editing software is activated at the HTTP-intermediary side (e.g., on the same computer or on a computer connected to it) and the user accesses the software as if it is running inside its browser. This is achieved by using a virtual display that the HTTP-intermediary produces, such as VNC or RDP, running the software on it and submitting a viewer, that can be used as a client of the virtual display, to the browser. The viewer is optionally written in a language that will permit it to automatically run on the browser, without the need to install any plug in, and without any confirmation from the user, for example, a client-side-active-code, such as, Java. Alternatively or additionally, the software is connected to a virtual device driver and generates screen commands which are transmitted to a viewer at the user's computer, for example, as HTML display commands. Various types of remote display servers are known in the art, including X11, for example.

In an exemplary embodiment of the invention, the process of the editing software is linked to the page being edited, for example by intermediary 106 passing the required filenames to the software. Optionally, a callback, hyperlink or watch is attached to the object which requires the editor, so that the intermediary can be informed when executing the editor is required.

In some embodiments of the invention it is noted that a standard viewer and/or the editing software and/or the virtual display used to display it may include many features that are not relevant to such as remote-display, and may confuse the user. In addition certain features may be dangerous for security, and serve as a breach of security. For instance, the user can use a dialog-box of "File->Open" to investigate the content of the disk on it the editing program runs. By using "File->Save-as" the user might change the content of the disk. The user may also use menus and an interface of the window-manager of the virtual display to breach security. Optionally, such risks are reduced or prevented by limiting parts of the user interface of the editing program and of the window-manager, or even disabling the window-manager. Optionally, mouse clicks on masked areas of the interface will not be registered. Optionally, only a "start" button and an "end" button are acceptable. In an exemplary embodiment of the invention, the editing software is open source software whose source code is modified. Alternatively or additionally, the software is executed under an emulation, such as WINE, which is optionally used to provide the security functions. For example, by using capabilities of WINE access to some features of the software can be denied. Alternatively or additionally, the software is executed in a CHROOT mode in which the software is restricted in its access to a file system. Alternatively or additionally, low privilege user settings are provided for the software.

Other Uses

Although the present invention has been described with reference to HTTP content such as HTML pages or XML pages, the present invention applied to other document formats and markup languages as well, in particular tagged document formats. For example, such other markup languages include, but are not limited to, Extensible Markup Language (XML), Vector Markup Language (VML), Virtual Reality Markup Language (VRML), Dynamic hypertext Markup language (DHTML), and Extended Markup language (XHTML). An example of other documents formats includes, but is not limited to a Postscript Document Format (PDF), Java applets, and Macromedia Flash (also known as Shockwave, also known as ActionScript).

As used herein, the term HTTP includes HTTPS and other derivatives. The term HTML as used herein includes derivatives, such as DHTML and XHTML.

In an embodiment of the invention other protocols than HTTP may be used to retrieve web pages. Thus, the use of HTTP is not required by the invention. The browser (or client processor) must simply understand the language of the inserted button and inserted client side active code and the protocol they invoke such as, but not limited to, FTP or WTP (Wireless Transaction Protocol).

As used herein an HTTP intermediary includes a range of devices that interact with the HTTP protocol, including a proxy.

It should be noted that the functionality of intermediary 106 may be distributed among several computers, including the client computer and the server. In particular, editing, detecting of changes, generation of definitions and application of definitions may be concentrated or distributed. In some, possibly less secure and/or user friendly embodiments, no intermediary is provided, instead a translation software is installed at the client or at the server or at another intermediate computer. Optionally, the editing is provided by the web server, for example to allow a site owner to edit his web pages.

The above description has focused on translation. However, there are other reasons for customization. In one example, users may desire to personalize their experience. Optionally, when a customization is made it refers to a tag associated with an edited object. For example, the customization definition might be that a tag of "date information" is to be deleted or repositioned.

Authorization

In some embodiments of the invention, not all users are authorized to make change sin a page. Additionally, some changes may require special authorization. In an exemplary embodiment of the invention, authorization is by identifying an IP used by the user. Alternatively or additionally, authorization is by providing a password or special code when requesting a page. Optionally, the page is requested via an HTML interface which requests a user and password (e.g., executing at intermediary 106) and then retrieves the requested page, or allows selecting the page form a list of via web server 110 (in a normal manner, except that intermediary 106 modifies the page) In another example, a user makes a second connection to intermediary 106 (or server 110, if it takes part in the process) which is used for authentication and/or passing instructions.

In another example, an active logo button is attached to the page in any case when it passes through intermediary 106 and a user can click on the logo button to log-on and/or request editing and saving.

It is noted that in general security is not provided at the client side as client side code is generally easy to circumvent and is provided mainly to prevent inadvertent changes. Optionally, a stronger security is provided by client side code, for example encryption.

How Changes in Document Are Embodied in Document

In an exemplary embodiment of the invention, changes in the documents are provided by defining definitions to be applied when a page passes through intermediary 106. Alternatively, the page or parts thereof may be replaced. Alternatively, web server 110 may be notified of changes.

Optionally, customizations are also applied to code in a page. Optionally, only quoted text is changed. Alternatively or additionally, input and/or output objects are changed, as described in the above patent by Marmor. This may be useful, for example, for receiving and converting and/or translating input from a user. Optionally, calculated expressions that should be transformed are captured by wrapping. In one example, the output of a document write command is captured and optionally modified. Optionally, the wrapping is by replacing the command in the script with a second command that first generates the proposed output, then applies the customization rules and then displays the output.

Optionally, the page is not directly modified by intermediary 106; rather, a script for the changes to be applied is attached to the page. The script may include the changes or may read the changes from a remote location.

General

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. It is noted that some of the above described embodiments may describe the best mode contemplated by the inventors and therefore include structure, acts or details of structures and acts that may not be essential to the invention and which are described as examples.

While the above description has focused on methods, it is meant to also encompass apparatus for carrying out the invention. The apparatus may be a system comprising of hardware and software. The apparatus may be a system, such as, programmed computers or a network appliance. The apparatus may include various computer readable media having suitable software thereon, for example, diskettes and computer and/or flash RAM.

Structure and acts described herein are replaceable by equivalents, which perform the same function, even if the structure or acts are different, as known in the art. Therefore, only the elements and limitations as used in the claims limit the scope of the invention. When used in the following claims, the terms "comprise", "include", "have" and their conjugates mean "including but not limited to".

The invention claimed is:

1. A method of defining customization for electronic visual content retrieved over an electronic connection, comprising:
    retrieving electronic visual content from a remote server to a local client, through an intermediary apparatus;
    locally editing the electronic visual content at the local client by a user using a WYSIWYG editor, wherein said editor is a standard software used for displaying of content and wherein said editing does not require installation of software requiring user authorization and does not change content stored in said remote server;
    detecting changes in said electronic visual content caused by said editing, after said editing is performed;
    automatically generating at least one customization definition based on said changes, said customization definition suitable for automatic applying to said electronic visual content; and
    modifying by said intermediary apparatus data provided at a later time according to the at least one customization definition for a visual presentation thereof at a plurality of local clients to a plurality of end users;
    wherein the intermediary apparatus supports the editing of said electronic visual content at the local client.

2. A method according to claim 1, wherein said retrieving comprises retrieving a tagged data file.

3. A method according to claim 2, wherein said intermediary apparatus is an HTTP intermediary.

4. A method according to claim 3, wherein said tagged data file is in a self-describing language.

5. A method according to claim 4, wherein said language is a hyper-text mark-up language.

6. A method according to claim 3, wherein said editor comprises an internet browser.

7. A method according to claim 1, wherein detecting changes comprises detecting changes using a hierarchical comparison of said electronic visual content before and after the editing.

8. A method according to claim 3, wherein said intermediary apparatus comprises a proxy.

9. A method according to claim 3, wherein the intermediary apparatus modifies the retrieved electronic visual content to allow at least one of said editing of the electronic visual content at the local client or the automatically generating of the at least one customization definition.

10. A method according to claim 9, wherein said modifying of the retrieved electronic visual content comprises marking at least some of said electronic visual content as editable.

11. A method according to claim 9, wherein said modifying of the retrieved electronic visual content comprises adding at least one control to said content.

12. A method according to claim 9, wherein said modifying of the retrieved electronic visual content comprises adding at least one client side code module to said electronic visual content.

13. A method according to claim 3, wherein automatically generating the at least one customization definition based on said editing comprises defining a spatial area to be customized.

14. A method according to claim 3, comprising overriding at least one automatically generated customization definition by said user.

15. A method according to claim 3, wherein said editing comprises editing without typing human understandable words.

16. A method according to claim 3, wherein said editing comprises editing by selection among choices.

17. A method according to claim 3, comprising manually defining at least one parameter of a customization definition.

18. A method according to claim 17, wherein said manually defining comprises defining different types of translation for different parts of said electronic visual content.

19. A method according to claim 14, wherein said overriding comprises requiring an exact match of an element of said electronic visual content to a definition, for a customization to be applied.

20. A method according to claim 14, wherein said overriding comprises allowing a match other than a one-to-one match to a definition, for a customization to be applied.

21. A method according to claim 3, wherein a customization definition is defined by a context in said electronic visual content.

22. A method according to claim 21, wherein said context is an expression defining elements in said electronic visual content to be part of the context.

23. A method according to claim 22, wherein said expression is a hierarchical expression.

24. A method according to claim 22, wherein said expression is an XPath or XPath-like type expression.

25. A method according to claim 24, wherein said expression is generated automatically.

26. A method according to claim 25, wherein said expression is generated in response to an editing activity.

27. A method according to claim 25, wherein said expression is generated in response to a marking by a user.

28. A method according to claim 21, wherein a context is defined based on a spatial location, during a display of the electronic visual content, of a label associated with an element to be customized.

29. A method according to claim 28, wherein an association of a label and an element is identified using a browser-internal script which finds spatial positions of the labels and spatial positions of nearby elements.

30. A method according to claim 3, wherein said intermediary apparatus authorizes said user to perform said editing.

31. A method according to claim 1, wherein the at least one customization definition is passed from said client to said intermediary apparatus.

32. A method according to claim 1, wherein modifying data provided at a later time comprises modifying electronic visual content requested by a second user.

33. A method according to claim 32, comprising deciding at least one property of said modifying based on information associated with a request by said second user.

34. A method according to claim 33, wherein said deciding comprises deciding if to apply a customization definition.

35. A method according to claim 33, wherein said deciding comprises examining a cookie at said second user.

36. A method according to claim 3, wherein modifying data provided at a later time comprises modifying dynamic visual content including at least one element whose visual content changes over time.

37. A method according to claim 1, wherein said modifying of data provided at a later time comprises determining a context.

38. A method according to claim 37, wherein determining a context comprises evaluating an XPath or XPath-like expression.

39. A method according to claim 37, wherein determining a context comprises determining spatial positions of labels associated with an element to be modified based on the customization definitions.

40. A method according to claim 1, wherein said intermediary apparatus comprises an HTTP intermediary, comprising:
(a) an HTTP connection to a server;
(b) an HTTP connection to a user;
(c) a page modifying module operative to add at least one of code and controls to a page requested by said user from said server, said code or control adapted to facilitate at least one of editing and customization definition.

41. A method according to claim 40, wherein said HTTP intermediary comprises a page transformer adapted to modify retrieved pages on the fly based on saved customization definitions.

42. A method according to claim 1, wherein said WYSIWYG editor comprises a browser having downloaded thereto at least one client side code, said client side code adapted to at least one of allow editing of visual content and determine changes due to editing of visual content.

43. A method according to claim 1, wherein modifying data provided at a later time comprises modifying data provided by the remote server.

44. A method according to claim 1, wherein modifying data provided at a later time comprises modifying data identical to the electronic visual content whose editing resulted in the customization definition.

45. A method according to claim 1, wherein modifying data provided at a later time comprises modifying data different from the electronic visual content whose editing resulted in the customization definition.

46. A method according to claim 1, wherein locally editing the electronic visual content comprises defining changes to be applied to said electronic visual content.

47. A method according to claim 46, wherein defining changes comprises at least one of: translation; replacement of text; changing of font; changing of text direction; changing of attributes; replacement of an image; an overlay that hide other elements or transparent; and scripts and client side code.

48. A method according to claim 1, wherein locally editing the electronic visual content comprises defining transformations to be applied to the electronic visual content when accessed by a user.

49. A method according to claim 1, wherein the detecting changes is performed by said intermediary apparatus.

50. A method according to claim 1, wherein the automatically generating at least one customization definition based on said changes is performed by said intermediary apparatus in response to the detection of changes to the electronic visual content.

51. A method according to claim 1, wherein the generated customization definition is associated with certain IP addresses.

52. A method of editing electronic visual content, comprising:
requesting electronic visual content from a first location;
analyzing the requested electronic visual content by an intermediary apparatus at a second location to determine elements that are customizable;
modifying said customizable electronic visual content elements using customization definitions generated based on previous modifications of other electronic visual content; and
entering in said electronic visual content editing commands at a third location by a user, which commands cause said intermediary apparatus to generate additional customization definitions that cause the intermediary apparatus to modify said electronic visual content said entering not preconditioned on the installation of software requiring user authorization other than a standard viewer or standard browser.

* * * * *